(12) United States Patent
Geist

(10) Patent No.: US 11,767,079 B2
(45) Date of Patent: Sep. 26, 2023

(54) SPROCKET FOR A BICYCLE DRIVE TRAIN

(71) Applicant: SRAM DEUTSCHLAND GmbH, Schweinfurt (DE)

(72) Inventor: Peter Geist, Berlin (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 97 days.

(21) Appl. No.: 17/171,935

(22) Filed: Feb. 9, 2021

(65) Prior Publication Data
US 2021/0253197 A1 Aug. 19, 2021

(30) Foreign Application Priority Data

Feb. 14, 2020 (DE) ...................... 10 2020 201 889.8

(51) Int. Cl.
*B62M 9/10* (2006.01)
*B21D 28/02* (2006.01)
*B21D 53/28* (2006.01)
*F16H 55/30* (2006.01)

(52) U.S. Cl.
CPC .............. *B62M 9/10* (2013.01); *B21D 28/02* (2013.01); *B21D 53/28* (2013.01); *F16H 55/30* (2013.01)

(58) Field of Classification Search
CPC .......... B62M 9/10; B21D 28/02; B21D 53/28; F16H 55/30
USPC ........................................................ 474/160
See application file for complete search history.

(56) References Cited

U.S. PATENT DOCUMENTS

| 6,907,764 B2 * | 6/2005 | Ushida ................... B21D 53/28 |
| | | 72/377 |
| 11,014,628 B2 * | 5/2021 | Choltco-Devlin ....... B62M 1/36 |
| 2007/0256465 A1 * | 11/2007 | Friese .................... B21D 22/14 |
| | | 72/215 |
| 2017/0292598 A1 | 10/2017 | Moore |
| 2017/0369124 A1 * | 12/2017 | Kamada .................. F16H 55/30 |
| 2019/0127022 A1 * | 5/2019 | Komatsu ................. F16H 55/30 |

FOREIGN PATENT DOCUMENTS

| DE | 102017012035 | | 6/2019 | |
| EP | 3064425 | | 9/2016 | |
| EP | 3401203 | A1 | 11/2018 | |
| EP | 3461731 | | 4/2019 | |
| EP | 3461731 | A1 | 4/2019 | |
| JP | 2012183555 | A * | 9/2012 | |
| WO | WO-2014166592 | A1 * | 10/2014 | ............ B21D 39/04 |
| WO | WO-2019115124 | A1 * | 6/2019 | |

* cited by examiner

*Primary Examiner* — Gene O Crawford
*Assistant Examiner* — Emily R Kincaid

(57) ABSTRACT

A sprocket for a bicycle drive train comprising an outer ring having external teeth for engaging in a bicycle chain, and an inner ring coaxially disposed with the outer ring and is connected to the outer ring in a rotationally fixed manner. The inner ring has a central opening. A circumferential collar is configured to be integral with the inner ring and projects axially to one side of the inner ring and is configured as a continuous collar. An internal profile having a plurality of radially inward-projecting radial protrusions is provided on the radially inner side of the collar, and an external profile having a plurality of radial depressions, which in number and arrangement correspond to the radial protrusions of the internal profile, is provided on the radially outer side of the collar.

11 Claims, 9 Drawing Sheets

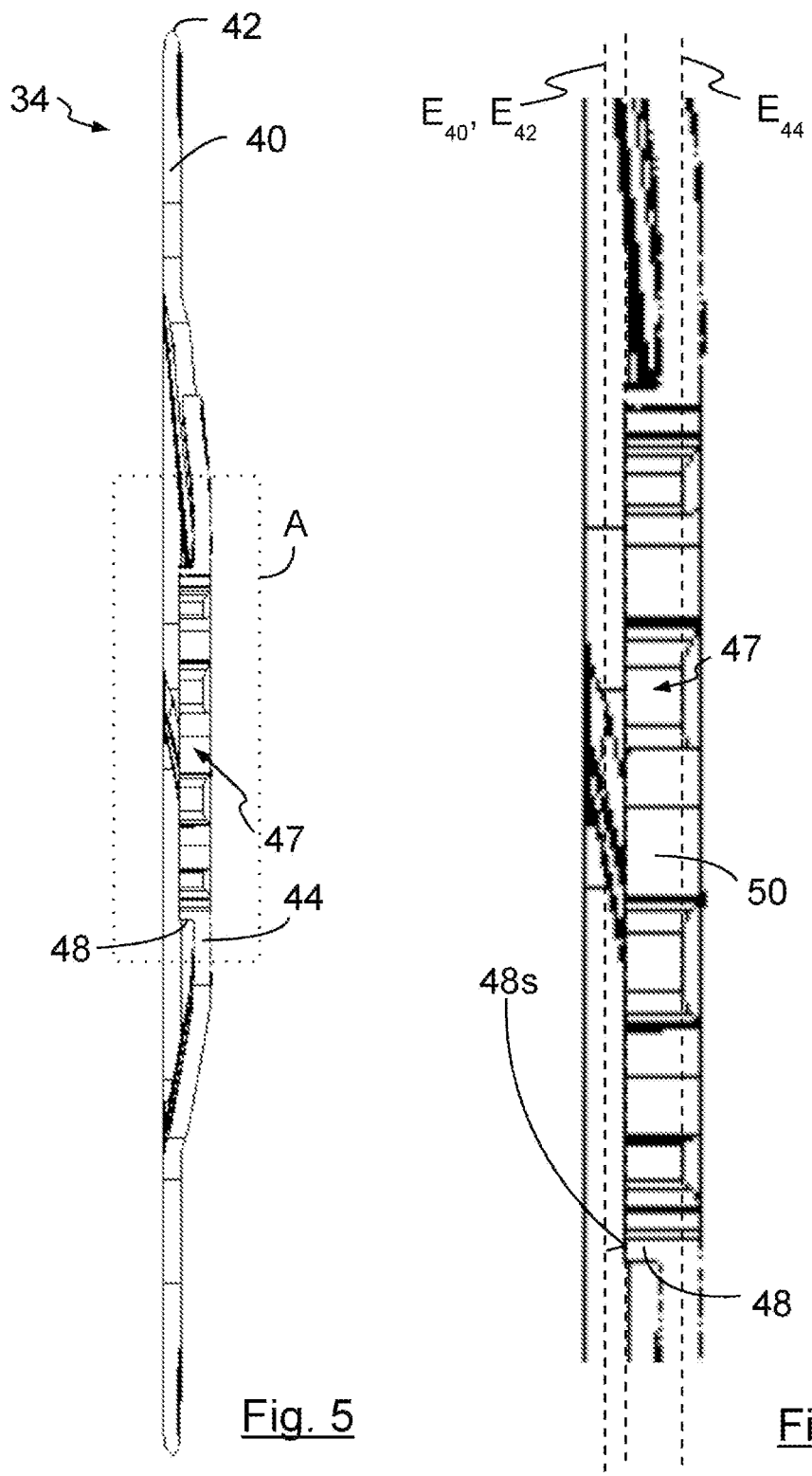

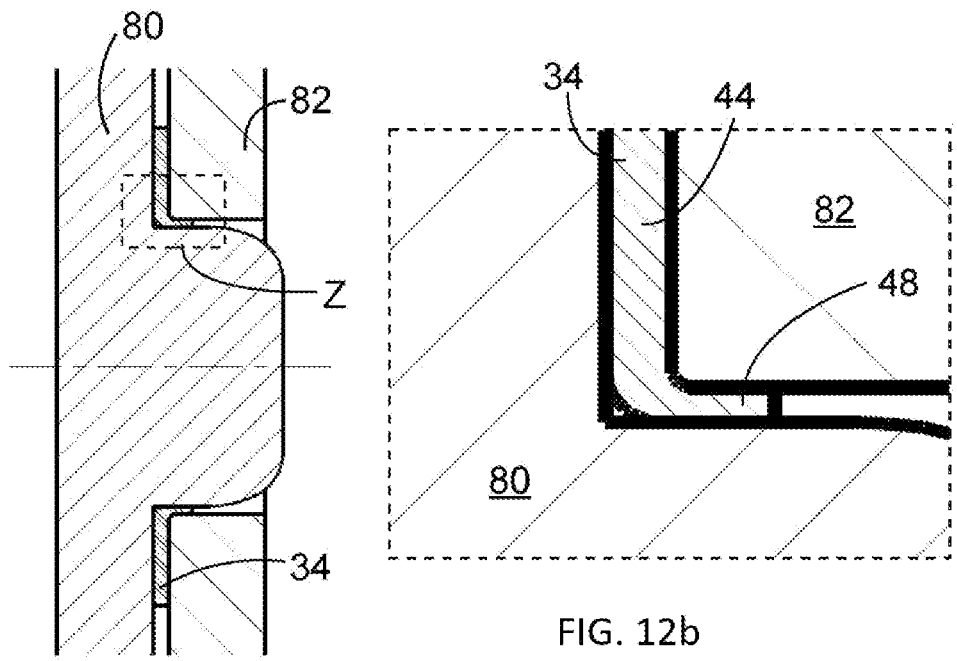
FIG. 12a
FIG. 12b
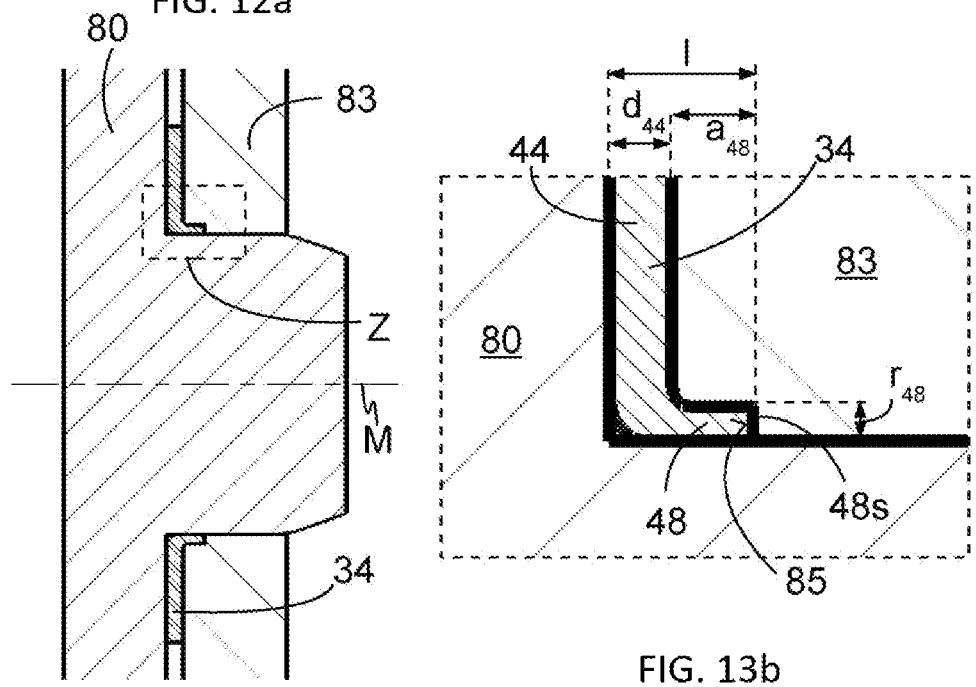
FIG. 13a
FIG. 13b

SPROCKET FOR A BICYCLE DRIVE TRAIN

PRIORITY

This application claims priority to, and/or the benefit of, German patent application No. DE 10 2020 201 889.8, filed on Feb. 14, 2020, the contents of which are included by reference herein in their entirety.

FIELD OF THE DISCLOSURE

This disclosure relates generally to bicycle components and, more specifically, to a sprocket for a bicycle drive train.

BACKGROUND

The term sprocket is intended to refer to a sprocket in the more concise sense, thus to a rear sprocket which is configured for transmitting torque to a driver on a rear wheel hub of a bicycle, but also to a front sprocket or chainring, respectively, which is configured for receiving torque from a foot pedal of the bicycle and, by way of the bicycle chain and a rear sprocket meshing with said bicycle chain, to transmit said torque onward to the driver and thus to the rear wheel of the bicycle.

The internal profile of such a sprocket may meet various requirements. A minimum radial dimension or face of the protrusions of the internal profile is derived, inter alia, from the materials of the sprocket and of that component to which said sprocket in the assembled state is coupled to transmit torque, as well as from the existing requirements set for the torque to be transmitted and the duration of loading.

If the radial dimension of the protrusions, or in other words the depth of the internal profile, is insufficient, an undesirable deformation of a load flank of the sprocket or/and of the afore-mentioned component coupled to the sprocket may arise during the operation.

The collar also in the axial direction has to provide a sufficient support face in relation to the components of the bicycle that bear on said collar so that no deformation arises in the riding operation, or that no excessive influence on the tightening torque results when assembling the sprocket or the sprocket cassette, respectively.

The afore-mentioned sprockets of the generic type in practice are conventionally produced such that in a forming method, also referred to as "collar-drawing", a collar having a circular radial internal face and a circular radial external face is first produced. The internal profile is subsequently cut into the radial inside of the collar, wherein the radial external face of the collar remains circular.

In order for the afore-mentioned faces of the collar to be sufficiently large for axial support, and in particular the faces for transmitting torque on the internal profile to be sufficiently large in the known sprockets, a comparatively large subtraction of material and thus a high investment in material is required for producing a sprocket.

SUMMARY

A sprocket for a bicycle drive train comprises an outer ring having external teeth for engaging in a bicycle chain, and an inner ring disposed coaxially with the outer ring. The inner ring is connected to the outer ring in a rotationally fixed manner and has a central opening. A circumferential collar is configured to be integral with the inner ring and projects axially to one side of the inner ring. The circumferential collar is configured as a continuous collar. The circumferential collar has an internal profile having a plurality of radially inward-projecting radial protrusions provided on a radially inner side of the circumferential collar. The circumferential collar has an external profile having a plurality of radial depressions provided on a radially outer side of the circumferential collar. The plurality of radial depressions corresponds to the plurality of radially inward-projecting radial protrusions in number and arrangement around the collar.

BRIEF DESCRIPTION OF DRAWINGS

The present disclosure will be explained in more detail hereunder by means of a preferred exemplary embodiment which is illustrated in the appended figures in which:

FIG. 5 shows a cross section of the sprocket of FIG. 3 taken along line V-V;

FIG. 6 shows an enlarged view of the region identified as A in FIG. 5;

FIG. 12a shows a partial cross-sectional illustration of a forming tool used in a forming step of the method according to FIG. 10, and of the sprocket formed therein;

FIG. 12b shows an enlargement of a region identified as Z in FIG. 12a;

FIG. 13a shows a partial cross-sectional illustration of a forming tool used in a further forming step of the method according to FIG. 10, and of the sprocket formed therein; and FIG. 13b shows an enlarged enlargement of the region identified as Z in FIG. 13a.

Figure 1:
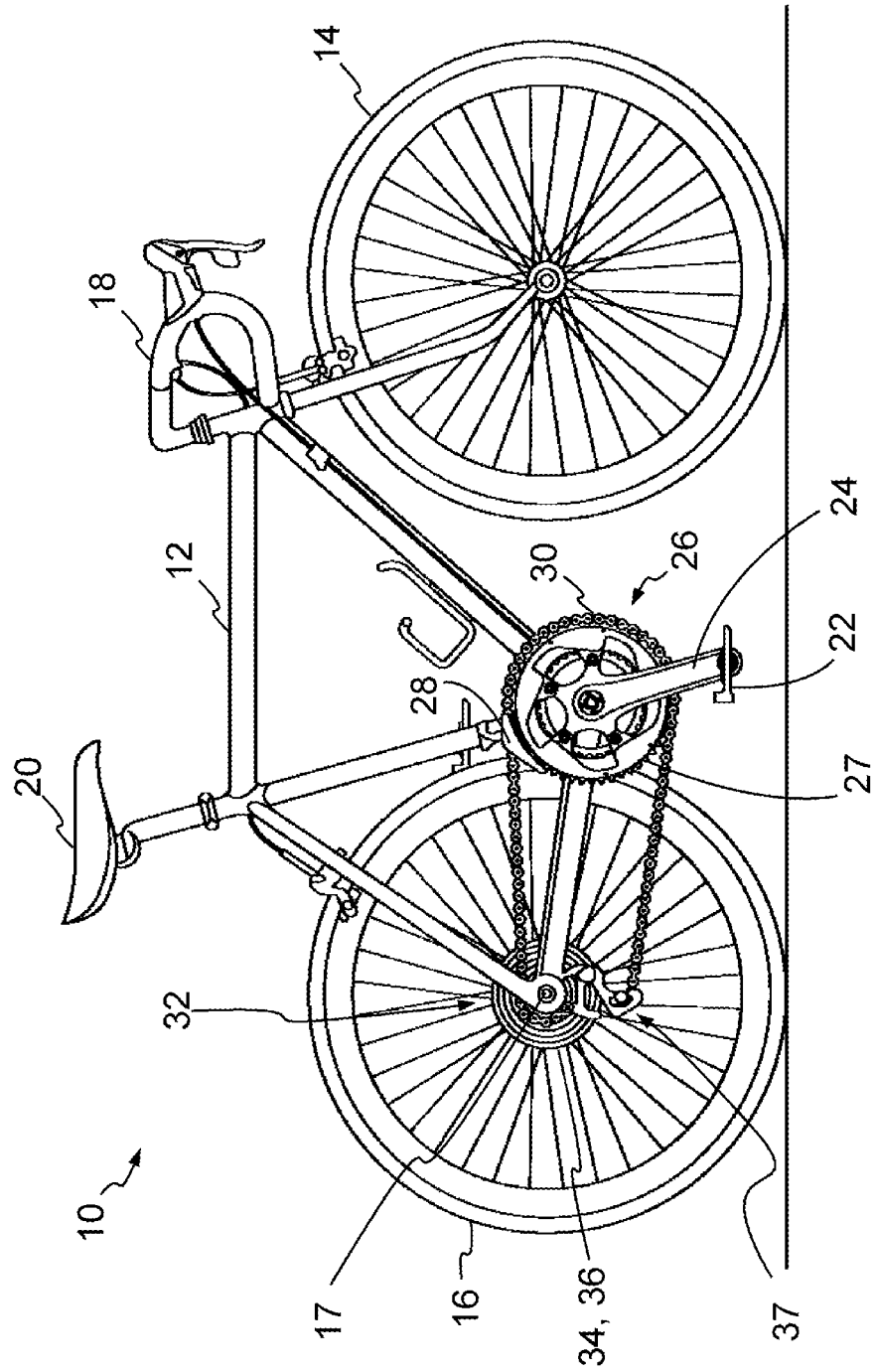
FIG. 1 shows a side view of a bicycle having a sprocket disclosed herein.

For reasons of clarity not every feature in the figures is always provided with a reference sign but primarily only those features which are required for explaining the respective figure. This applies in particular when a plurality of features of identical type are illustrated, of which only one or a few selected features is/are in most cases provided with a reference sign/reference signs.

DETAILED DESCRIPTION

Against the background of this prior art, the object of the present disclosure according to a first aspect lies in providing a sprocket which has positive torque transmission properties and is able to be produced in a material-saving manner.

This object according to an embodiment is achieved in that an external profile having a plurality of radial depressions, which in number and arrangement correspond to the radial protrusions of the internal profile, is provided on the radially outer side of the collar.

It is thus possible for at least a preform of the final internal profile to be produced conjointly with the external profile by a forming method in which material is only redistributed but not subtracted.

While material is indeed optionally subsequently subtracted on the internal profile so as to generate a desired profile shape and/or profile depth, the quantity of the material to be subsequently removed can however be reduced in comparison to a sprocket of the generic type in which the internal profile is generated exclusively by material subtraction, this reducing the required investment in material.

Terms such as radial, axial, coaxial, etc. presently refer to a central axis of the sprocket which during operation also corresponds to the rotation axis of said sprocket.

The inner ring and the outer ring in the sprocket according to an embodiment are preferably configured so as to be mutually integral.

The thickness of the inner ring, or a dimension of the inner ring in the axial direction, can be between 1.5 mm and 2 mm, for example, preferably between 1.6 mm and 1.8 mm. The collar can axially protrude from the inner ring by a few millimetres such that the sprocket at the central opening has an axial dimension of 2.5 mm to 8 mm, for example, preferably of 3 to 7 mm, particularly preferably of 3.3 mm to 6.5 mm. The afore-mentioned axial dimension corresponds approximately to the axial extent of the internal profile minus minimal corrections by virtue of radiused edges.

The sprocket according to an embodiment is preferably used as a rear sprocket. In this case, the protrusions of the internal profile of the circumferential collar serve as driver elements which are configured for transmitting torque from the sprocket to a driver on a rear wheel hub of a bicycle.

Alternatively, the sprocket can be used as a front sprocket or a chainring. In this case, the protrusions of the internal profile of the circumferential collar serve to transmit torque from the foot pedals, or a component connected thereto, to the protrusions.

In both cases, the circumferential collar in the state of the sprocket assembled on the bicycle can project axially inward from the inner ring, that is to say to that side that is disposed so as to be more proximal to a wheel central plane of the bicycle or inboard side. However, it is also not to be excluded that the sprocket in the two afore-mentioned cases is in each case assembled such that the circumferential collar projects axially outward from the inner ring on the outboard side, for instance when the collar is used as a spacer in relation to a neighbouring sprocket.

According to a preferred embodiment it can be provided that each of the protrusions of the internal profile has a first flank which is arranged so as to lead with respect to a predetermined rotation direction about a central axis of the sprocket, and a second flank which is arranged so as to trail with respect to the predetermined rotation direction, wherein the first flank and the second flank for at least one, preferably for a plurality, and particularly preferably for each, of the protrusions of the internal profile are configured so as not to be mutually mirror-symmetrical.

In configurations in which torque is transmitted only in one rotation direction, for instance in the case of freewheeling, a sufficiently large torque-transmitting face of the first flank that serves as a load flank can thus be achieved at the same time, and the risk of tilting can moreover be reduced by way of a face of the second flank, or counter flank, which is configured in a correspondingly smaller manner.

To this end, it can be provided that the first flank of the at least one protrusion of the internal profile is radially longer than the second flank. This preferably applies to a plurality, particularly preferably to each, of the protrusions of the internal profile. For example, a radial length of the second flank can be 75% or less, preferably 66% or less, of the radial length of the first flank.

When the sprocket is used as a rear sprocket, the predetermined rotation direction is preferably the forward rotation direction. When the sprocket is used as a chainring, the predetermined direction is preferably the reverse rotation direction, because the first flank in each of the two cases is in each case the load flank by way of which torque is transmitted.

In order to be able to position the external teeth of the sprocket in a space-saving manner in the axial direction and in an aerodynamically favourable manner close to the rear wheel, it can be provided that a central plane of the external teeth for engaging in a bicycle chain or a central plane of the outer ring is axially spaced apart from a central plane of the inner ring. An axial end face of the circumferential collar in axial terms is particularly preferably disposed between the central plane of the inner ring and the central plane of the external teeth or of the central plane of the outer ring.

The sprocket according to an embodiment can be used as a terminating sprocket of a sprocket cassette, for example, thus as that sprocket of a sprocket set that as the only sprocket is configured for transmitting torque directly to a driver on a rear wheel hub of a bicycle.

Alternatively, said sprocket according to an embodiment can also be configured as a single sprocket or as a plug-in sprocket. In the latter case, a plurality or all of the sprockets of a sprocket set can be configured as sprockets for transmitting torque engage in each case with a driver. The collars of the sprocket according to an embodiment that project axially to one side herein can simultaneously serve as spacers, this reducing the number of required components.

The disclosure is also for a sprocket cassette for a bicycle drive train, comprising a sprocket set having a plurality of sprockets which have dissimilar diameters and are coaxially disposed and axially mutually spaced apart and connected to one another in a rotationally fixed manner. One of these sprockets is a terminating sprocket which is configured for transmitting torque directly to a driver on a rear wheel hub of a bicycle. The terminating sprocket is a sprocket according to an embodiment as has been described above.

The disclosure is furthermore also for a bicycle drive train having a driver and at least one sprocket, preferably having a plurality of sprockets, or having a sprocket cassette described above.

According to a second aspect, a method for producing a sprocket for a bicycle drive train, comprising the following steps: punching a sprocket blank having a central provisional hole; and further processing the sprocket blank so as to form a sprocket having a central opening, an inner ring, and a circumferential collar which is configured so as to be integral to the inner ring and projects axially from the latter to one side, preferably so as to form a sprocket according to an embodiment as has been described above, wherein step ii) comprises the following step: a) forming the sprocket blank, wherein a punch is pushed through the provisional hole of the sprocket blank into a die so as to form the circumferential collar.

According to an embodiment, on account of the forming of the sprocket blank in step a) an internal profile having a plurality of radially inward-projecting radial protrusions is configured on the radially inner side of the collar, and an external profile having a plurality of radial depressions which in terms of number and arrangement correspond to the protrusions of the internal profile is configured on the radially outer side of the collar.

The central provisional hole in step i) is preferably not configured so as to be circular but such that said central provisional hole has a plurality of radially inward-projecting protrusions which in terms of number and arrangement correspond to the radially inward-projecting radial protrusions of the internal profile of the collar that is configured later, this enabling a simple and more uniform redistribution of material in the following forming step.

The external profile of the collar and the internal profile, or at least a preliminary stage of the internal profile of the collar, are in this instance generated by suitably shaped punches and dies, for example, in the forming method.

According to a preferred embodiment it can be provided that step ii) after step a) furthermore comprises a step b) in which the internal profile of the circumferential collar produced by the forming method is post-machined, for example by cutting or milling.

For example, faces which are particularly sensitive in terms of tolerances can be post-machined, in particular such faces which in the assembled state are in direct contact with the driver.

The asymmetry of the two flanks of at least one protrusion, as has already been described in the context of the sprocket, can be produced in this post-machining step b).

It can thus be provided that in step b) for at least one of the protrusions of the internal profile, preferably for a plurality of the protrusions and particularly preferably for each of the protrusions, a first flank of the protrusion that is disposed so as to lead with respect to a predetermined rotation direction or/and a second flank of the protrusion that is disposed so as to trail with respect to the predetermined rotation direction is/are post-machined such that the first flank after the post-machining is radially longer than the second flank.

The forming method for configuring the collar can be carried out in multiple steps. For example, step a) after a first forming step a1) in which the collar having the internal profile and the external profile is shaped, can preferably comprise yet one further forming step a2) in which the sprocket blank, or the sprocket, respectively, is further formed so as to establish a predefined axial dimension of the collar.

To this end, the die used in the first forming step can be replaced by a modified die. This preferably also permits a desired planarity of the axial end face of the collar to be established. If desired, the punch used in the first forming step can also be replaced in step a2).

It is to be mentioned as a side note only that the technique described above is also suitable for producing a disc brake rotor for a bicycle.

A bicycle in general is identified by the reference sign 10 in FIG. 1. The bicycle 10 comprises a frame 12, a front wheel 14, a rear wheel 16, a handlebar 18, and a saddle 20. Even though the bicycle 10 illustrated in an exemplary manner here is a racing bicycle, it is obvious that the invention presently described can also be used in other bicycle types, for instance in a mountain bike.

In the usual manner, a torque on the bicycle 10 can be introduced into a front sprocket or chainring 27 of a crankset 26 by way of pedals 22 and cranks 24. This torque by way of a closed revolving bicycle chain 30 is then transmitted to a sprocket cassette 32 on a rear wheel hub 17 of the bicycle 10.

The sprocket cassette 32 comprises a sprocket set having a plurality of rear sprockets which have dissimilar diameters and are coaxially disposed, axially mutually spaced apart and connected to one another in a rotationally fixed manner, of which the largest in the example illustrated is a sprocket 34 according to an exemplary embodiment.

The sprocket 34 serves as a terminating sprocket 36 and is configured for transmitting the torque introduced by way of the bicycle chain 30 directly to a driver on the rear wheel hub 17, said driver not being visible in FIG. 1 and will be explained in more detail in the context of FIG. 9.

The rear sprocket of the sprocket cassette 32 that meshes in each case with the bicycle chain 30 can be selected in a known manner by a rear derailleur 37, while the corresponding front sprocket or chainring 27 can be selected by a front derailleur 28. The rear derailleur 37 and the front derailleur 28 can in each case be actuated mechanically or/and electrically in a known manner.

Figure 2:
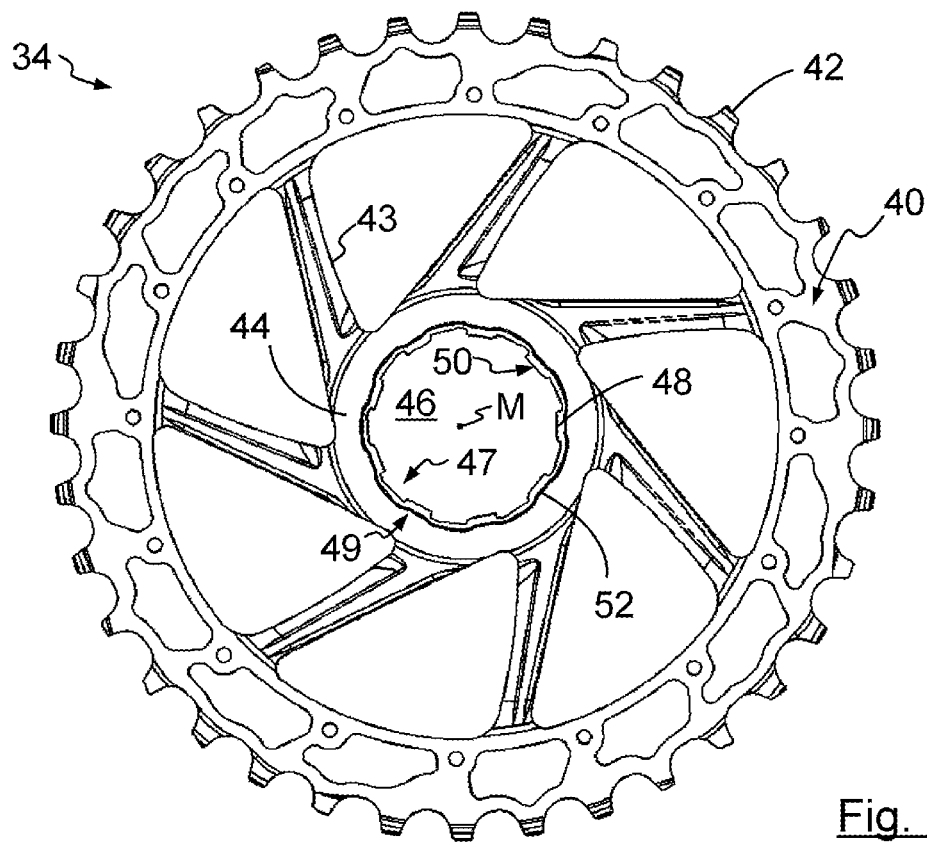
FIG. 2 shows an inboard side of the sprocket of FIG. 1 according to the exemplary embodiment.
Figure 3:
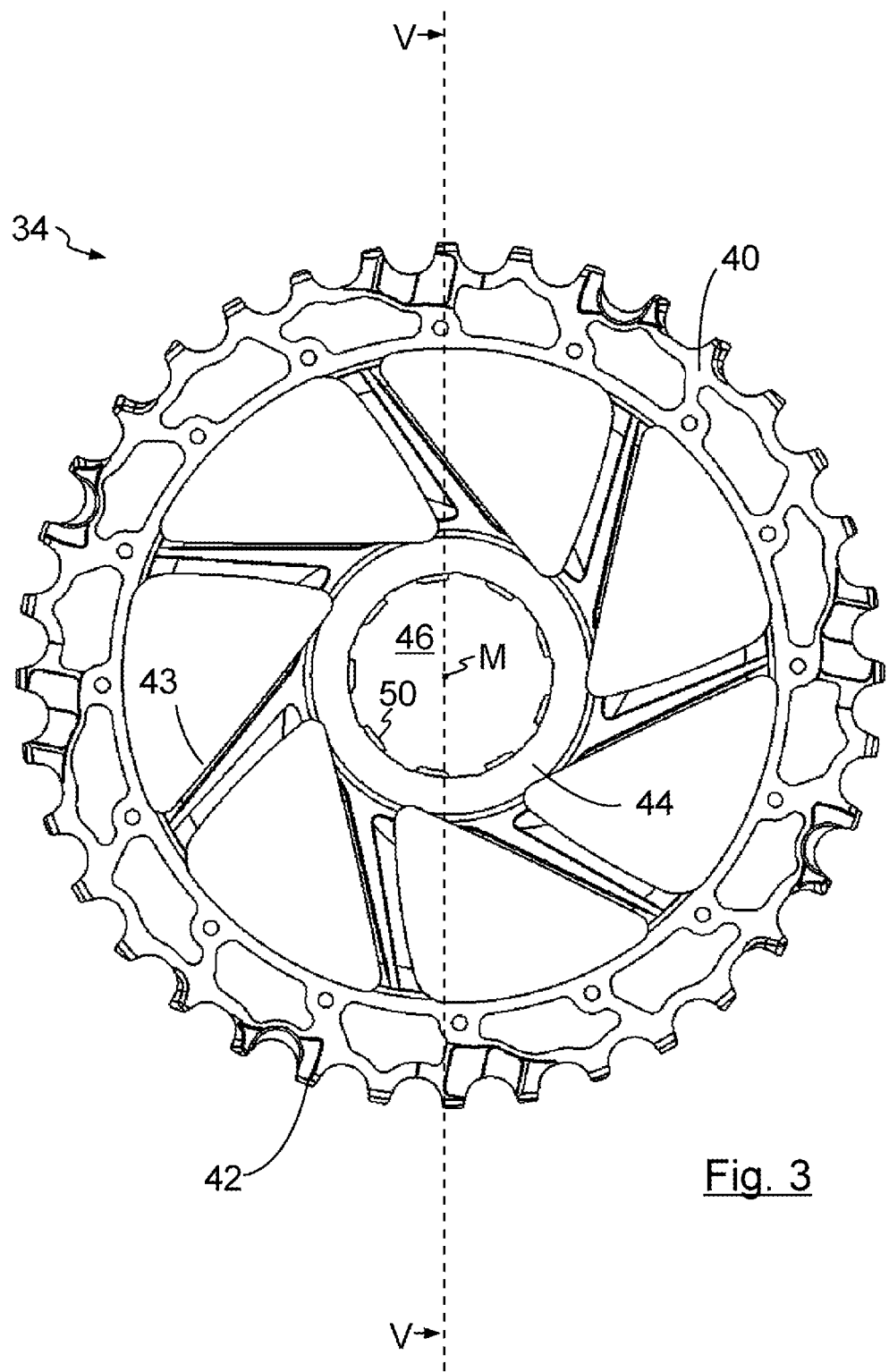
FIG. 3 shows an outboard side of the sprocket of FIG. 2.
Figure 4:
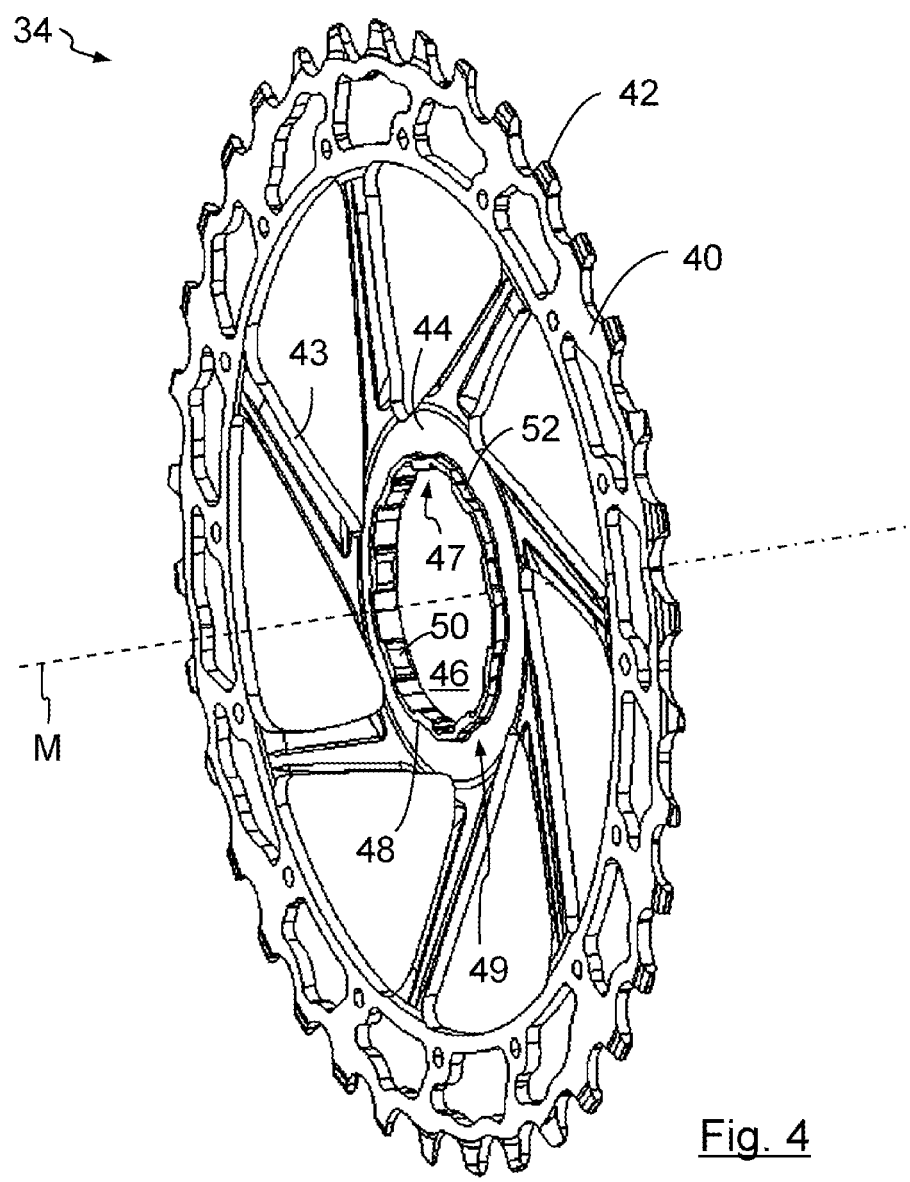
FIG. 4 shows a perspective view of the sprocket of FIG. 2.

FIG. 2 shows an inboard side of the sprocket 34 according to an embodiment, thus onto that side that in the assembled state faces the rear wheel 16. An outboard side of the sprocket 34 is illustrated in FIG. 3, and a perspective view is illustrated in FIG. 4.

The sprocket 34 comprises an outer ring 40 having an external teeth 42 for engaging in the bicycle chain 30, and an inner ring 44 which in terms of the central axis M of the sprocket 34 is disposed so as to be coaxial with the outer ring 40 and is connected to the latter in a rotationally fixed manner and is presently configured so as to be integral to the latter, and has a central opening 46.

The inner ring 44 and the outer ring 40 in a first approximation are configured as planar annular discs and in a known manner are connected to one another by a plurality of connection arms 43 which from the inner ring 44 run obliquely towards the outside.

A circumferential collar 48 is provided on the sprocket 34. The circumferential collar 48 is configured so as to be integral to the inner ring 44 and so as to project axially from the inner ring 44 to one side, in FIG. 2, projecting axially towards the observer.

The collar 48 on the radial inside thereof has an internal profile 47 having a plurality of radially inward-projecting protrusions 50. An external profile 49 having a plurality of radial depressions 52, which in terms of number and arrangement correspond to the radial protrusions 50 of the internal profile 47, is provided on the radial outside of the collar 48.

It can be seen in FIGS. 4 to 6 that a central plane $E_{42}$ of the external teeth 42, or a central plane $E_{40}$ of the outer ring 40, is presently configured so as to be parallel to a central plane $E_{44}$ of the inner ring 44 but axially offset from the latter. In other words, the sprocket 34 is configured in a dished manner, this enabling the external teeth 42 to be positioned so as to be more proximal to the rear wheel 16.

More specifically, in the example illustrated, an axial end face 48s of the circumferential collar 48 is disposed axially between the central plane $E_{44}$ of the inner ring 44 and the central plane $E_{42}$ of the external teeth 42, or the central plane $E_{40}$ of the outer ring 40 (cf. FIG. 6).

The shape of the collar 48, in particular the shape of the internal profile 47 and of the external profile 49, will be described in more detail hereunder with reference to FIGS. 2a, 4, 7, and 8.

The internal profile 47 in the shown embodiment has nine protrusions 50 which are distributed uniformly around the circumference of the collar 48, for example, while the external profile 49 correspondingly has nine depressions 52 which are likewise distributed. The exact shape of the internal profile 47 herein may deviate from the shape of the external profile 49 and is adapted to the shape of the driver used.

Figure 7:
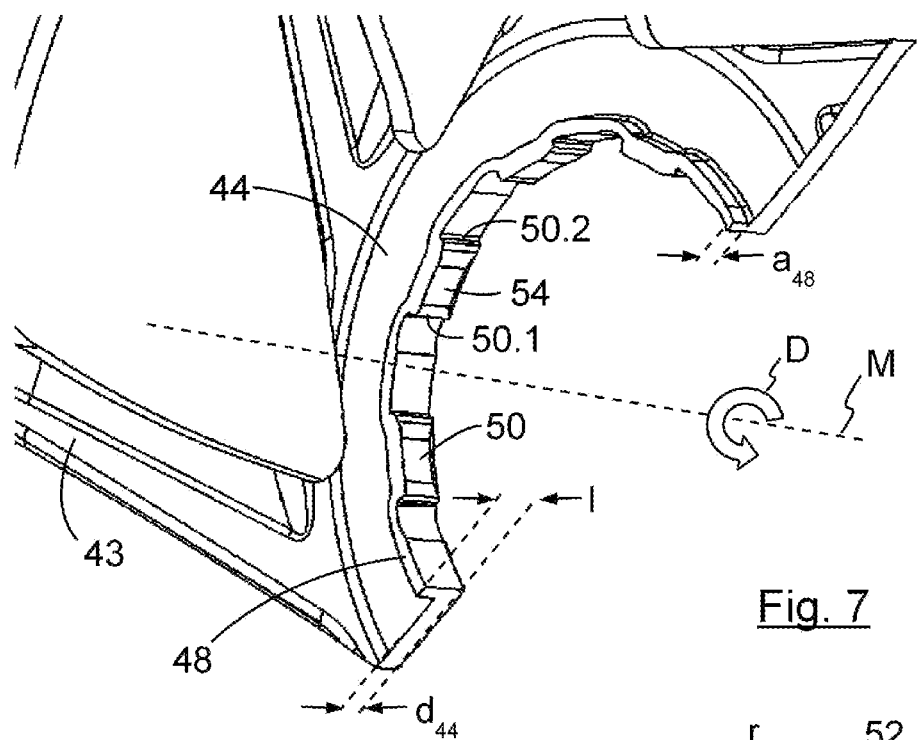
FIG. 7 shows an enlarged perspective view of a portion of the sprocket of FIG. 2.

The external profile 49 preferably extends approximately across the entire axial length $a_{48}$ of the collar 48, and the internal profile 47 extends approximately across an axial length 1 which is derived as the sum of the axial length $a_{48}$ of the collar 48 and the axial extent or thickness $d_{44}$ of the inner ring 44 (cf. FIG. 7).

The thickness $d_{44}$ of the inner ring is between 1.5 mm and 2 mm, for example, preferably between 1.6 mm and 1.8 mm. The above-mentioned axial length 1 here is approximately 2.5 mm to 8 mm, preferably between 3 mm and 7 mm, particularly preferably between 3.3 mm and 6.5 mm.

Figure 2A:
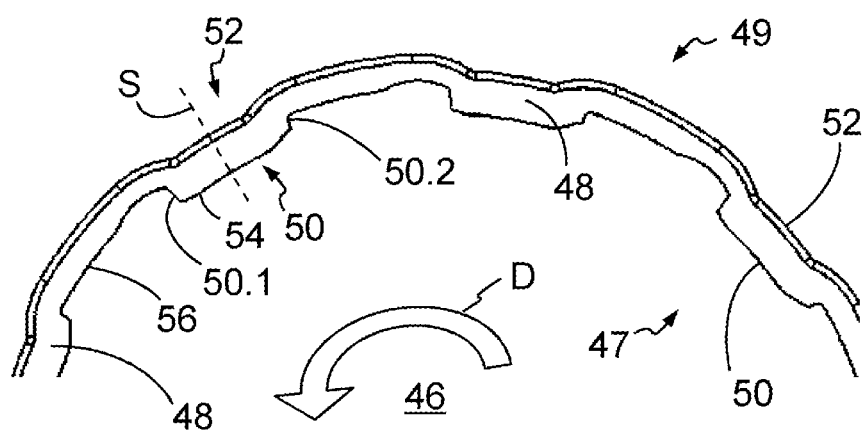
FIG. 2a shows an enlarged view of a portion of a collar of the sprocket of FIG. 2.
Figure 8:
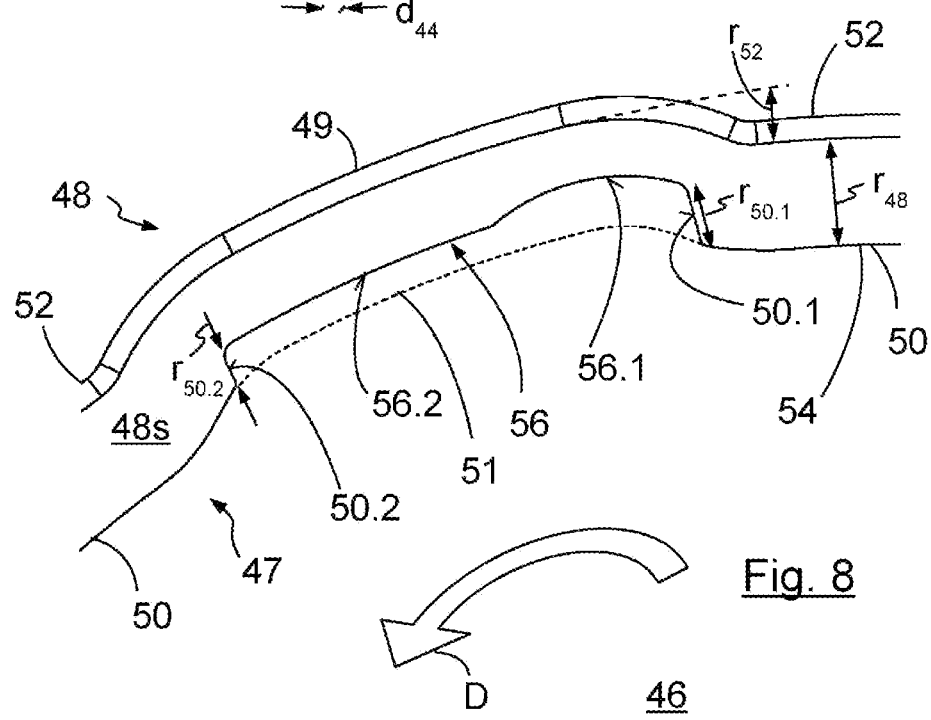
FIG. 8 shows a further enlarged view of the collar of the sprocket of FIG. 2 showing the shape of the flanks of the protrusions of an internal profile of the collar.

FIGS. 2a, 7, and 8 show the shape of the internal profile 47 and of the external profile 49 of the collar 48 in different enlarged fragments which show that there is a significant asymmetry in the protrusions 50 of the internal profile 47, while the corresponding depressions 52 of the external profile 49 are in each case constructed so as to be substantially mirror-symmetrical in relation to a respective mirror plane S which in FIG. 2a is indicated for a selected protrusion 50, or the corresponding depression 52, respectively.

Each protrusion 50 has a first flank 50.1 (load flank) which is arranged or disposed so as to lead with respect to a predetermined or selected rotation direction D (presently the forward rotation direction), and a second flank 50.2 (counter flank) which is arranged or disposed so as to trail with respect to this rotation direction D, said flanks 50.1 and 50.2 being connected to one another by a plateau portion 54.

A depressed region 56 which has two portions 56.1 and 56.2 is provided between directly adjacent protrusions 50 of the internal profile 47, wherein the first portion 56.1 is directly contiguous to the first flank 50.1 of a protrusion 50, while the second portion 56.2 is directly contiguous to the second flank 50.2 of another adjacent protrusion 50. The first portion 56.1 herein is more offset to the rear than the second portion 56.2 this leading to the first flank 50.1 in the radial direction being configured so as to be longer than the second flank 50.2. For example, the radial length $r_{50.2}$ of the second flank can be 75% or less, preferably 66% or less, of the radial length $r_{50.1}$ of the first flank (cf. FIG. 8).

As will be described in more detail hereunder, the collar 48 is produced by a forming method in which the external profile 49, and conjointly therewith at least a preform of the internal profile 47 are configured by using suitable tools, said preform in FIG. 8 being indicated by a dashed line and referred to as a provisional internal profile 51.

The final shape of the internal profile 47, in particular the final shape of the flanks 50.1, 50.2 of the protrusions 50 of the internal profile 47 and of the depressed regions 56 is preferably generated in a post-machining step, for example by cutting or milling.

It is to be noted that the radial protrusions of the preform 51 of the internal profile prior to the post-machining in a first approximation are configured so as to be mirror-symmetrical in the exemplary embodiment illustrated, and the asymmetry of the protrusions 50 of the final internal profile 47 is only incorporated by the post-machining step.

The collar 48 prior to the post-machining has a radial dimension $r_{48}$ of 1 to 2 mm, preferably of 1.3 to 1.5 mm, particularly preferably of approximately 1.4 mm, said radial dimension $r_{48}$ being substantially constant across the circumference of the collar. The radial depth $r_{52}$ of the depressions 52, the former corresponding to the radial length of the protrusions of the preform 51 of the internal profile, is between 0.5 mm and 0.7 mm, for example.

Figure 9:
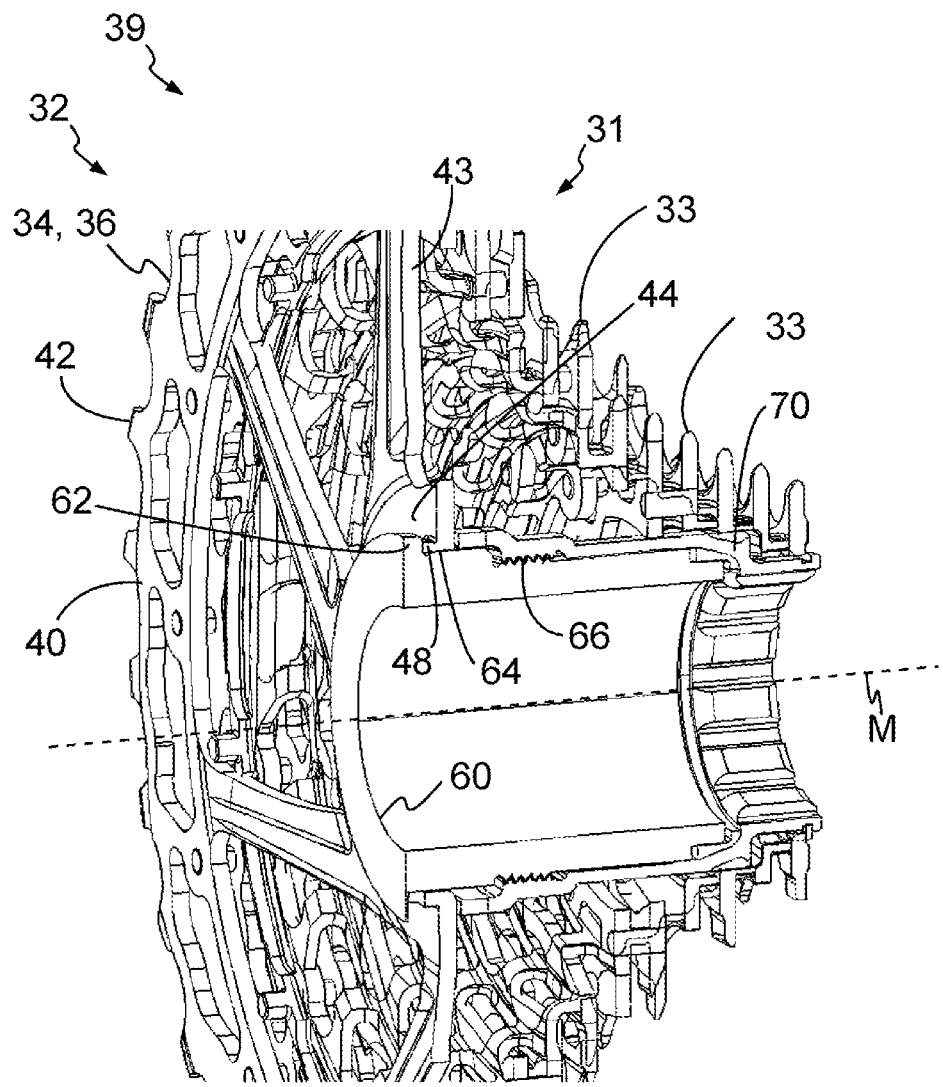
FIG. 9 shows a perspective view of a sprocket cassette according to an embodiment in a partially sectional illustration in which the sprocket illustrated in FIGS. 2 to 8 is used as a terminating sprocket.

FIG. 9 shows a perspective view of a sprocket cassette 32 according to a preferred exemplary embodiment in a partially sectional illustration. The sprocket cassette 32 comprises a sprocket set 31 having a plurality of sprockets which are disposed so as to be coaxial with the central axis M, axially spaced apart and connected to one another in a rotationally fixed manner, of which the largest is a sprocket 34 according to FIGS. 1 to 8. The other conventional sprockets are identified by the reference sign 33.

The sprocket set 31 is attached to a driver 60 which in a known manner can be assembled on the rear wheel hub of the bicycle 10 (not illustrated in FIG. 9).

The driver 60 has a hollow-cylindrical basic shape, having an annular protrusion 62 at one axial end, an externally toothed portion 64 which axially adjoins the annular protrusion 62, and a threaded portion 66 which axially follows said externally toothed portion 64.

In order for torque to be transmitted from the sprocket set 31 to the driver 60, the driver 60 in the region of the externally toothed portion 64 engages with the protrusions 50, configured as driver elements, of the internal profile 47 of the collar 48 of the largest sprocket 34 which according to the exemplary embodiment is configured as a terminating sprocket 36.

An adapter sleeve 70 can be screwed onto the threaded portion 66. The adapter sleeve 70 conjointly with the annular protrusion 62 axially fixes the sprocket set 31.

The driver 60, the adapter sleeve 70, and the other sprockets 33 of the sprocket set 31, with the exception of the terminating sprocket 36, can be embodied in a conventional manner, for example as described in publication EP 3461731 A1.

When another, conventional, adapter having an externally toothed portion which axially extends across a larger length is used, a plurality of sprockets designed according to the disclosure can also be used as single sprockets or plug-in sprockets. The circumferential collar of the various sprockets which is provided according to the disclosure can serve as a spacer such that separate spacer elements can be dispensed with.

Figure 10:
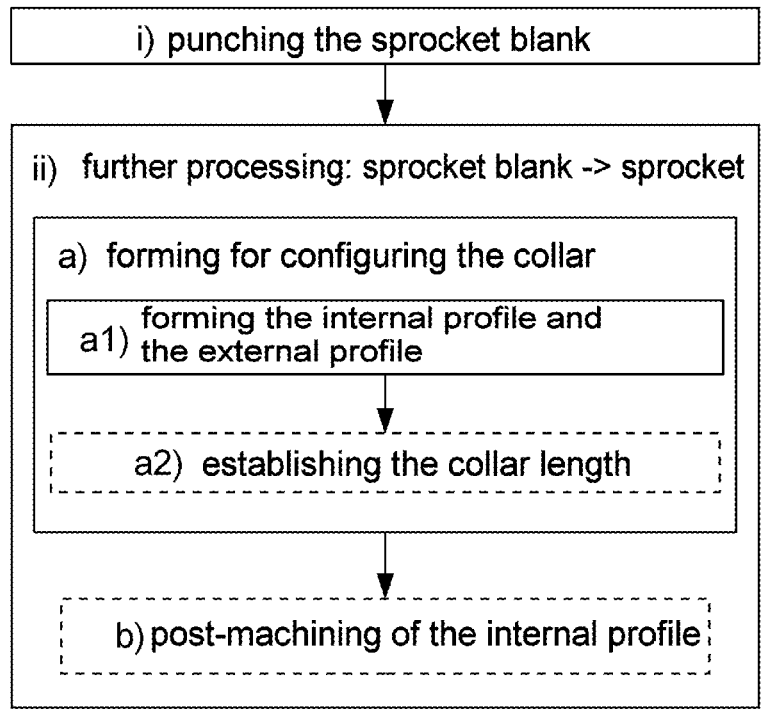
FIG. 10 shows a flow chart for illustrating a method according to an exemplary embodiment.
Figure 11:
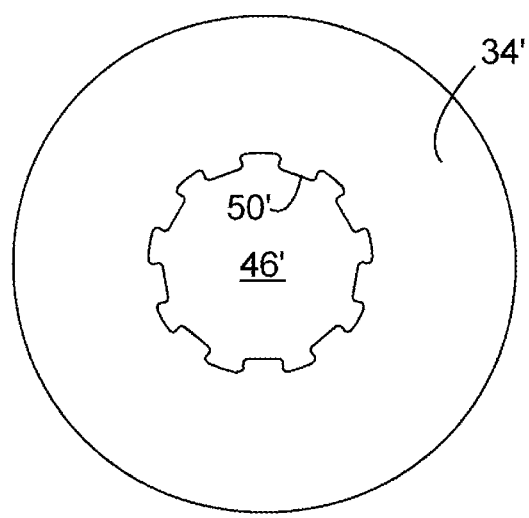
FIG. 11 shows a schematic illustration of a sprocket blank which by the method according to FIG. 10 is produced as an intermediate product.

An exemplary embodiment of a method for producing a sprocket according to the disclosure for a bicycle drive train will be explained hereunder by means of the highly schematic flow chart in FIG. 10 and the schematic illustrations of FIGS. 11 to 13. Optional steps are identified by a dashed frame in the flow chart of FIG. 10.

First, in a first step i), a sprocket blank 34' is punched from a sheet material. The punched sprocket blank 34' comprises at least one central provisional hole 46'. The latter is preferably not circular but already has a plurality of radially inward-projecting protrusions 50' (cf. FIG. 11).

The sprocket blank 34' in a further step ii) is further processed so as to form the actual sprocket 34.

The sprocket blank 34' herein is first formed in a step a), wherein a punch 80 (cf. FIG. 12) is pushed through the provisional hole 46' of the sprocket blank 34' into a die 82 such that an inner ring 44 having a central opening 46 and a circumferential collar 48 which is configured so as to be integral to the inner ring 44 and projects axially to one side of said inner ring 44 is configured. The collar 48 herein is created from material which surrounds the central provisional hole 46' of the sprocket blank 34' and defines the central opening 46 of the final sprocket 34.

The cross-sectional shape of the punch 80 and the die 82 in a plane perpendicular to the central axis M herein is chosen so as not to be round but that in step a), presently more specifically in a sub-step a1), an external profile 49 having a plurality of radial depressions 52, and an internal profile 47 having a plurality of radial protrusions 50 which project radially inward are configured on the collar 48, wherein the number and arrangement of the radial depressions 52 of the external profile 49 and the radial protrusions 50 of the internal profile 47 correspond to one another.

If desired, the axial dimension $a_{48}$ (collar length) of the collar 48 can be more specifically established in a subsequent forming step a2) in that the die 82 used in step a1) is replaced by a further die 83 which has an additional forming face 85 for defining the end side 48s of the collar 48. The planarity of the end side 48s can also be established on account thereof. It may arise that the curvature radius of the transition from the inner ring 44 to the radial inside of the collar 48 is modified on account thereof, as is derived from a comparison of FIGS. 12 and 13.

Finally, the shape of the internal profile of the collar can optionally be post-machined, in particular post-cut, such that, for example, proceeding from the preform 51 which in FIG. 7 is indicated by a dashed line, the final shape of the internal profile 47 which therein is illustrated in solid lines is generated.

The method according to the disclosure enables a simple and favourable production of a sprocket having positive torque transmission properties.

What is claimed is:

1. A sprocket for a bicycle drive train, comprising:
   an outer ring having external teeth for engaging in a bicycle chain;
   an inner ring disposed coaxially with the outer ring, the inner ring connected to the outer ring in a rotationally fixed manner and has a central opening;
   a circumferential collar configured to be integral with the inner ring and projecting axially to one side of the inner ring, the circumferential collar configured as a continuous collar; and
   the circumferential collar having an internal profile having a plurality of radially inward-projecting radial protrusions provided on a radially inner side of the circumferential collar, the circumferential collar having an external profile having a plurality of radial depressions provided on a radially outer side of the circumferential collar, the plurality of radial depressions corresponding to the plurality of radially inward-projecting radial protrusions in number and arrangement around the circumferential collar,
   each of the radially inward-projecting radial protrusions of the internal profile having a first flank which is arranged so as to lead with respect to a predetermined rotation direction about a central axis of the sprocket, and a second flank which is arranged so as to trail with respect to the predetermined rotation direction, wherein for at least one of the radially inward-projecting radial projections, the first flank and the second flank are not mirror-symmetrically with respect to one another.

2. The sprocket according to claim 1, wherein the radially inward-projecting radial protrusions of the internal profile of the circumferential collar are driver elements which are configured for transmitting torque from the sprocket directly to a driver on a rear wheel hub of a bicycle.

3. The sprocket according to claim 1, wherein for each of the radially inward-projecting radial projections, the first flank and the second flank are not mirror-symmetrically with respect to one another.

4. The sprocket according to claim 1, wherein the first flank of at least one of the radially inward-projecting radial protrusions of the internal profile is radially longer than the second flank.

5. A sprocket for a bicycle drive train, comprising:
   an outer-ring having external teeth for engaging in a bicycle chain;
   an inner ring disposed coaxially with the outer ring, the inner ring connected to the outer ring in a rotationally fixed manner and has a central opening;
   a circumferential collar configured to be integral with the inner ring and projecting axially to one side of the inner ring, the circumferential collar configured as a continuous collar; and
   the circumferential collar having an internal profile having a plurality of radially inward-projecting radial protrusions provided on a radially inner side of the circumferential collar, the circumferential collar having an external profile having a plurality of radial depressions provided on a radially outer side of the circumferential collar, the plurality of radial depressions corresponding to the plurality of radially inward-projecting radial protrusions in number and arrangement around the circumferential collar,
   wherein an axial end face of the circumferential collar is axially disposed between a center plane of the inner ring and a center plane of the external teeth for engaging in the bicycle chain or a center plane of the outer ring.

6. A sprocket cassette for a bicycle drive train, comprising:
   a sprocket set having a plurality of coaxially arranged, axially spaced-apart and non-rotatably interconnected sprockets of different diameters, wherein one of the plurality of sprockets is a terminating sprocket which is configured for transmitting torque directly to a driver on a rear wheel hub of a bicycle, the terminating sprocket comprising:
   an outer ring having external teeth for engaging in a bicycle chain;
   an inner ring disposed coaxially with the outer ring, the inner ring connected to the outer ring in a rotationally fixed manner and has a central opening; and
   a circumferential collar configured to be integral with the inner ring and projecting axially to one side of the inner ring, the circumferential collar configured as a continuous collar,
   the circumferential collar having an internal profile having a plurality of radially inward-projecting radial protrusions provided on a radially inner side of the circumferential collar, the circumferential collar having an external profile having a plurality of radial depressions provided on a radially outer side of the circumferential collar, the plurality of radial depressions corresponding to the plurality of radially inward-projecting radial protrusions in number and arrangement around the circumferential collar,
   wherein an axial end face of the circumferential collar is axially disposed between a center plane of the inner ring and a center plane of the external teeth for engaging in the bicycle chain or a center plane of the outer ring.

7. A method for producing a sprocket for a bicycle drive train, comprising the following steps:
   i) punching a sprocket blank having a central provisional hole,
   ii) further processing the sprocket blank to form a sprocket having a central opening, an inner ring, and a circumferential collar integral with and projecting axially to one side of the inner ring,
   wherein step ii) comprises at least the following step:
   a) forming the sprocket blank, wherein a punch is pushed through the provisional hole of the sprocket blank into a die to form the circumferential collar,
   wherein the forming in step a) forms an internal profile having a plurality of radially inward-projecting radial protrusions on a radially inner side of the circumferential collar, and an external profile having a plurality of radial depressions corresponding in number and arrangement to the plurality of radially inward-projecting radial projections on the internal profile on a radially outer side of the circumferential collar.

8. The method according to claim 7, wherein in step i) the central provisional hole is formed to have a plurality of radially inward-projecting radial protrusions corresponding in number and arrangement to the radially inwardly projecting projections of the internal profile of the circumferential collar formed in step ii).

9. The method according to claim 7, wherein the step ii) after step a) furthermore comprises the following step:
   b) post-machining of the internal profile of the circumferential collar produced during the forming method, preferably by cutting or milling.

10. The method according to claim 9, wherein in step b) for at least one of the radially inward-projecting radial protrusions of the internal profile, a first flank of the radially inward-projecting radial protrusion that is arranged so as to lead with respect to a predetermined rotation direction and/or a second flank of the radially inward-projecting radial protrusion that is arranged so as to trail with respect to the predetermined rotation direction, is/are post-machined such that the first flank after the post-machining is configured to be radially longer than the second flank.

11. The method according to claim 7, wherein the step a) furthermore comprises the following step:
   a2) forming the sprocket blank or the sprocket, respectively, such that a predefined axial dimension of the circumferential collar is established.

* * * * *